US011732819B2

United States Patent
Jaśkiewicz et al.

(10) Patent No.: US 11,732,819 B2
(45) Date of Patent: Aug. 22, 2023

(54) SERVO VALVE (71) Applicant: Hamilton Sundstrand Corporation, Charlotte, NC (US)

(72) Inventors: Zbigniew Jaśkiewicz, Wroclaw (PL); Przemyslaw Kielczykowski, Kielczów (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/184,836

(22) Filed: Feb. 25, 2021

(65) Prior Publication Data
US 2021/0270385 A1 Sep. 2, 2021

(30) Foreign Application Priority Data

Mar. 2, 2020 (EP) ..................................... 20461517

(51) Int. Cl.
*F16K 31/124* (2006.01)
*F16K 11/078* (2006.01)

(52) U.S. Cl.
CPC .......... *F16K 31/124* (2013.01); *F16K 11/078* (2013.01)

(58) Field of Classification Search
CPC ... F16K 31/124; F16K 11/078; F15B 13/0438
See application file for complete search history.

(56) References Cited

U.S. PATENT DOCUMENTS

| 2,775,254 | A | * | 12/1956 | Stanbury | ............ | G05D 16/2097 137/83 |
| 2,964,018 | A | | 12/1960 | Farron | | |
| 3,023,782 | A | | 3/1962 | Chaves et al. | | |
| 3,029,830 | A | * | 4/1962 | Klover | ................ | F15B 13/0438 137/82 |
| 3,217,728 | A | * | 11/1965 | Pegram | ............... | F15B 13/0436 137/83 |

(Continued)

FOREIGN PATENT DOCUMENTS

| DE | 3630200 A1 | 3/1988 |
| GB | 2104249 A | 3/1983 |

(Continued)

OTHER PUBLICATIONS

European Search Report for Application No. 20461517.3, dated Aug. 4, 2020, 7 pages.

(Continued)

*Primary Examiner* — Umashankar Venkatesan
(74) *Attorney, Agent, or Firm* — Cantor Colburn LLP (57) ABSTRACT

A servo valve includes: a fluid transfer valve assembly comprising a supply port and a control port ($P_A$, $P_B$); a moveable valve spool arranged to regulate flow of fluid from the supply port to the control port in response to a control signal; and a drive means configured to axially move the valve spool relative to the fluid transfer assembly in response to the control signal to regulate the fluid flow. The drive means comprises an elongate member arranged to rotate in response to the control signal. The elongate member has a cam profile in the fluid flow path such as to vary the pressure acting on the ends of the spool as the cam profile rotates.

8 Claims, 7 Drawing Sheets

(56) References Cited

U.S. PATENT DOCUMENTS

| | | | | |
|---|---|---|---|---|
| 3,555,969 | A | * | 1/1971 | Shah ................... F15B 13/16 |
| | | | | 91/363 R |
| 3,712,339 | A | * | 1/1973 | Bartholomaus ..... F15B 13/0438 |
| | | | | 137/625.62 |
| 4,046,061 | A | | 9/1977 | Stokes |
| 5,024,247 | A | * | 6/1991 | Lembke ................ H01F 7/1615 |
| | | | | 137/82 |
| 5,070,898 | A | * | 12/1991 | Jagodzinski ........ F15B 13/0438 |
| | | | | 137/82 |
| 6,786,238 | B2 | | 9/2004 | Frisch |
| 7,337,806 | B2 | | 3/2008 | Spickard et al. |
| 9,303,781 | B2 | * | 4/2016 | Veilleux, Jr. ........ F15B 13/0438 |
| 9,309,900 | B2 | | 8/2016 | Kopp |
| 2015/0047729 | A1 | | 2/2015 | Kopp et al. |
| 2015/0276083 | A1 | * | 10/2015 | Druhan .................... H02K 7/14 |
| | | | | 251/129.11 |
| 2016/0160886 | A1 | * | 6/2016 | Baker ................ F15B 13/0438 |
| | | | | 251/30.01 |
| 2018/0038503 | A1 | | 2/2018 | Spickard et al. |
| 2019/0277314 | A1 | | 9/2019 | Sawicki et al. |
| 2019/0277423 | A1 | | 9/2019 | Zak et al. |

FOREIGN PATENT DOCUMENTS

| | | |
|---|---|---|
| JP | S511695 U | 1/1976 |
| WO | 2006104765 A2 | 10/2006 |

OTHER PUBLICATIONS

EP Office Action for EP Application No. 20461517.3, dated Oct. 5, 2022, pp. 1-5.

* cited by examiner

FIG. 1a

PRIOR ART

SERVO VALVE

FOREIGN PRIORITY

This application claims priority to European Patent Application No. 20461517.3 filed Mar. 2, 2020, the entire contents of which is incorporated herein by reference.

TECHNICAL FIELD

The present disclosure relates to servo valves used to transfer quantities of, or manage the flow of fluids, e.g., oil, fuel, or air.

BACKGROUND

Servo valves find a wide range of applications for controlling air, fuel, oil or other fluid flows to effect driving or control of another part, e.g., an actuator.

A servo valve assembly may include a drive assembly such as a motor controlled by a control current which controls fluid flow to or from an actuator. Generally, a servo valve transforms an input control signal into movement of an actuator cylinder. The actuator controls another component which, in some examples, may be a valve. In other words, a servo valve acts as a controller, which commands the actuator, which changes the position of a valve's flow modulating feature.

Such mechanisms are used, for example, in various parts of aircraft where the management of fluid/air flow is required, such as in engine fuel control, oil flow, engine bleeding systems, anti-ice systems, air conditioning systems and cabin pressure systems. Servo valves also are widely used to control the flow and pressure of pneumatic and hydraulic fluids to an actuator, e.g. to control moving parts such as flight control surfaces, flaps, landing gear, and in applications where accurate position or flow rate control is required. Some examples of applications are aircraft, automotive systems and in the space industry.

Conventionally, servo valve systems operate by obtaining pressurised fluid from a high pressure source which is transmitted through a load from which the fluid is output as a control fluid. Various types of servo valves are known, examples of which are described in UK Patent Application No. GB 2104249A, U.S. Patent Application Publication No. 2015/0047729 and U.S. Pat. No. 9,309,900.

Electrohydraulic servo valves can have a first stage with a motor, e.g. an electrical or electromagnetic force motor or torque motor, controlling flow of a hydraulic fluid to drive a valve member e.g. a spool valve of a second stage, which, in turn, can control flow of hydraulic fluid to an actuator for driving a load. The motor can operate to position a moveable member, such as a flapper, in response to an input drive signal or control current, to drive the second stage valve member e.g. a spool valve by controlling the flow of fluid acting on the spool. Movement of the spool causes alignment between the ports and fluid channels to be changed to define different flow paths for the control flow. Such systems are known in the art and will not be described further in detail.

Such conventional systems will be described in more detail below with reference to FIGS. 1a, 1b and 1c.

Servo valves are often required to operate at various pressures and temperatures and so components parts need to be large enough to handle the large amounts of fluid needed to operate under such conditions. For example, in fast acting air valve actuators, relatively large amounts of fluid are required depending on the size of the actuator and the valve slew rate. For such high flow rates, however, large valve orifice areas are required. For 'flapper' type servo valves, problems arise when dealing with large flows due to the fact that flow force acts in the direction of the flapper movement and the motor is forced to overcome the flow forces. For clevis-like metering valves such as those described in U.S. Pat. Nos. 4,046,061 and 6,786,238, the flow forces, which are proportional to the flow, act simultaneously in opposite directions so that the clevis is balanced and centered. The clevis, however, needs to be big due to the requirement for bigger orifices to handle larger flows.

Jet pipe servo valves are types of valves that provide an alternative to 'flapper'—type servo valves. Jet pipe servo valves are usually larger than flapper type servo valves but are less sensitive to contamination. In jet pipe systems, fluid is provided via a jet pipe to a nozzle which directs a stream of fluid at a receiver. When the nozzle is centered—i.e. there is no current from the motor so it is not caused to turn, the receiver is hit by the stream of fluid from the nozzle at the centre so that the fluid is directed to both ends of the spool equally. If the motor causes the nozzle to turn, the stream of fluid from the nozzle impinges more on one side of the receiver and thus on one side of the spool more than the other, which causes the spool to shift. The spool shifts until the spring force of a feedback spring produces a torque equal to the motor torque. At this point, the nozzle is centred again, pressure is equalized on both sides of the receiver and the spool is held in the centered position. A change in motor current moves the spool to a new position corresponding to the applied current.

Both flapper and jet pipe systems are fairly large, bulky systems with a complex construction of several moving parts and channels, which means that there are several potential points of failure. The fluid flow channels and long fluid paths slow down the response time for the position of the spool to change in response to changes in the control signal, and can also become blocked and unreliable.

There is a need for improved servo valve arrangements that can handle large fluid flows effectively and at high operation frequency, but with lower power consumption, and enabling variable control, whilst retaining a compact design and being less vulnerable to contamination, damage and leakage.

The present disclosure provides a servo valve assembly as defined in claim 1.

The fluid transfer valve assembly may further comprise a positioning mechanism at the ends of the valve spool, e.g. a torsion spring at each of the respective ends of the valve spool or some other mechanical or electrical position feedback arrangement.

The valve spool may be moveably mounted in a cylindrical housing, having an end cap at each end.

Also provided is a method of driving a valve spool of a servo valve as defined in claim 9.

Preferred embodiments will now be described with reference to the drawings.

BRIEF DESCRIPTION OF THE DRAWINGS

Certain embodiments of the disclosure are described below by way of example only and with reference to the accompanying drawings, in which.

DETAILED DESCRIPTION

A servo valve as described below can, for example, be used in an actuator control system. The servo valve is controlled by a drive assembly to control a flow of fluid that is output to control the movement of an actuator. The actuator can control e.g. ailerons or elevator flaps of an aircraft.

Conventional jet pipe and flapper servo valves will first be described with reference to FIGS. 1a, 1b and 1c.

Figure 1A:
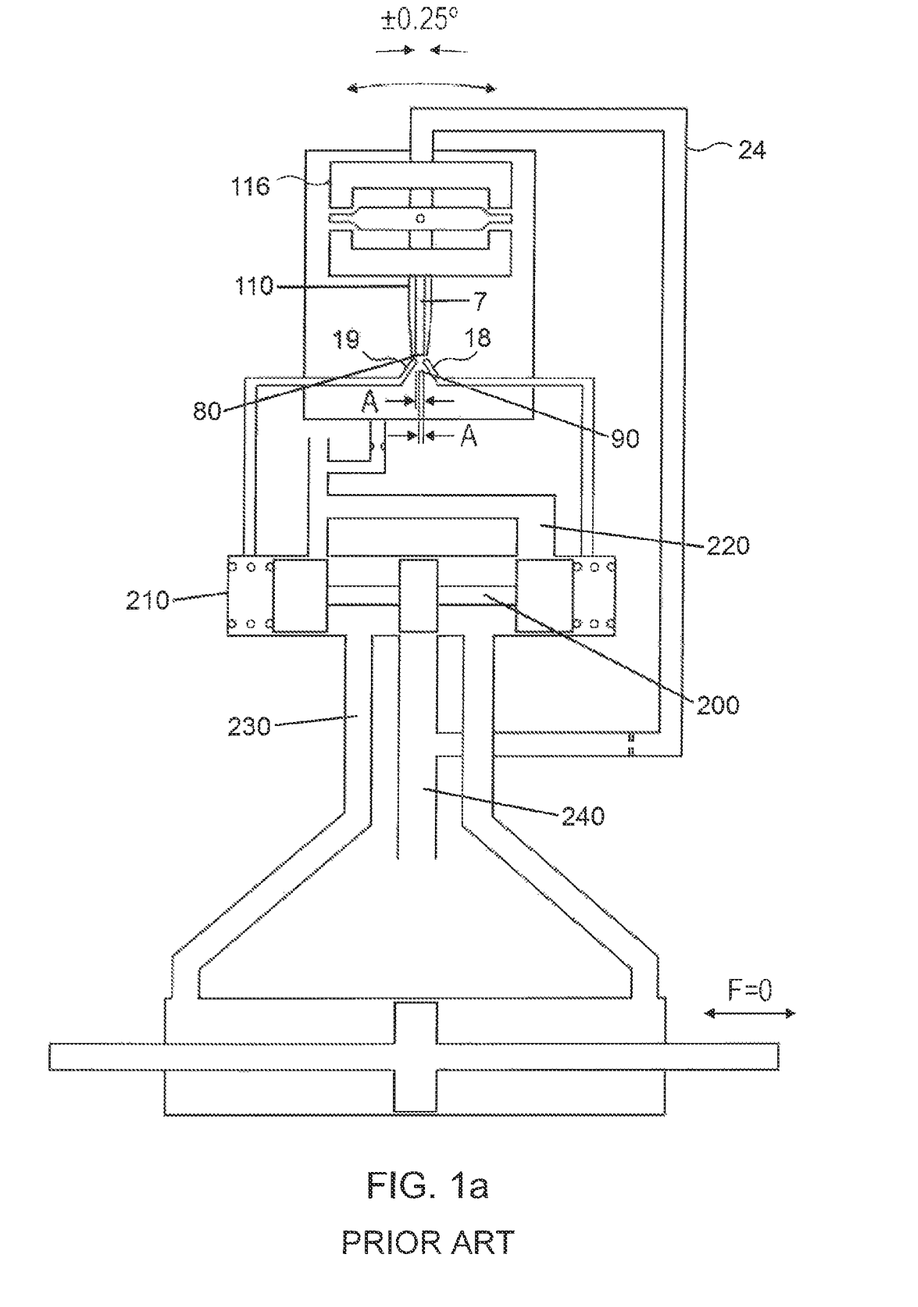
FIG. 1a is a schematic view of a conventional jet-pipe type servo valve.

In a conventional jet-pipe type assembly, as shown in FIG. 1a, the arrangement comprises a servo valve assembly having a torque motor 116 and a moveable spool 200, mounted in a supporting block 210, or mounted in a cylinder mounted in a block. The spool is, as for the flapper type arrangement, part of a spool assembly having: supply ports 220, control ports 230, and a return port 240. Flow is possible between the ports via a passage through the spool. The torque motor 116 provides current that causes a jet pipe 70 to turn at its end closest to the spool, which end terminates in a nozzle 80. Supply fluid is provided from the supply port, via a supply pipe 24 to the top of the jet pipe—i.e. the end opposite the end with the nozzle, and the supply fluid flows through the jet pipe 70 and out of the nozzle 80. A receiver 90 is provided in the block below the nozzle 80. The receiver 90 provides two channels 118,119 via which fluid from the nozzle flows into the spool. When no current is applied by the motor to the jet pipe, the nozzle 80 is centered relative to the receiver 90 and supply fluid exiting the nozzle flows equally through both channels 118, 119 and thus equally to both ends of the spool. The spool therefore remains centered—i.e. 'closed' so that no fluid flows through the control ports. When actuator control is desired, the motor 116 provides a control current to the jet pipe 70 causing the nozzle 80 to turn away from the centered position. The fluid supplied through the nozzle then flows predominantly through one receiver channel as compared to the other channel. More fluid flows, therefore, into the corresponding end of the spool causing axial movement of the spool 200. This either blocks/occludes the passage between the supply port and the respective control port or opens the passage to allow flow between the two ports, depending on the axial position of the spool due to the position of the nozzle 80, thus modulating pressure on the control ports and controlling the actuator. The supply pipe 24 is connected to the supply port and routes supply fluid external to the spool and into the top end of the jet pipe 70. The supply fluid flows down the jet pipe to the nozzle 80 and exits to the receiver 90 described above. The jet pipe is preferably mounted in a flexural tube 110. While the nozzle is centered, equal amounts of fluid go to the two ends of the spool.

Figure 1B:
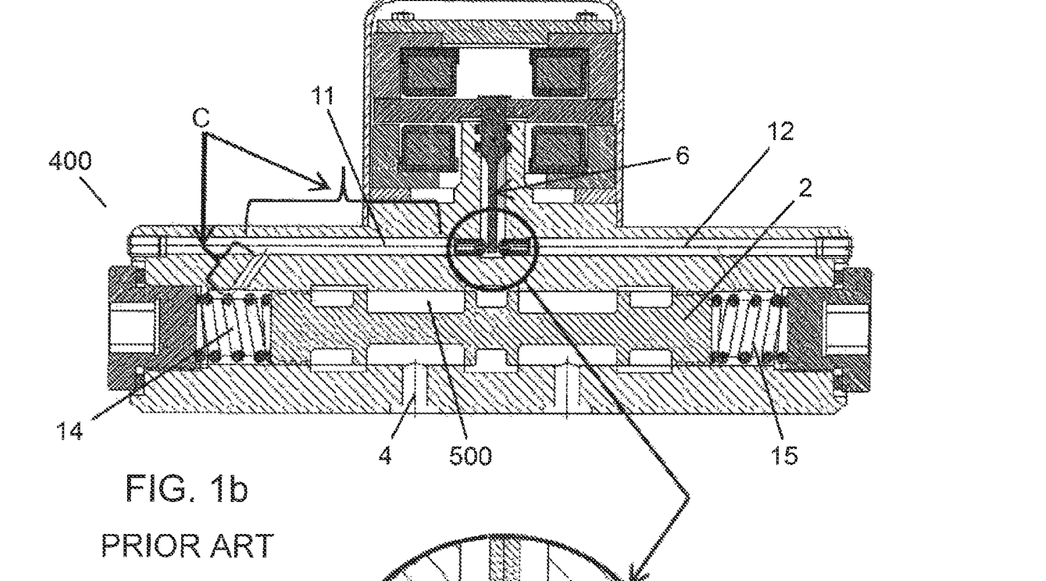
FIG. 1b is a schematic view of a conventional flapper type servo valve.
Figure 1C:
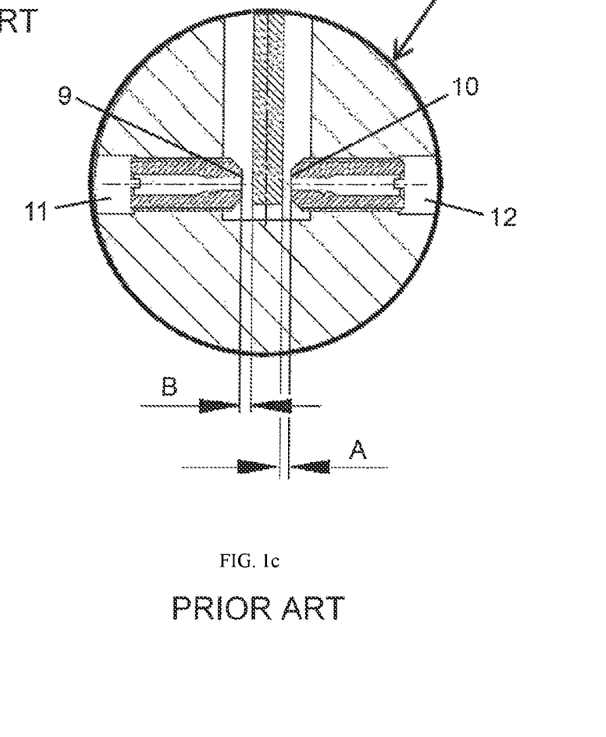
FIG. 1c is a detail from FIG. 1b.
Figure 2:
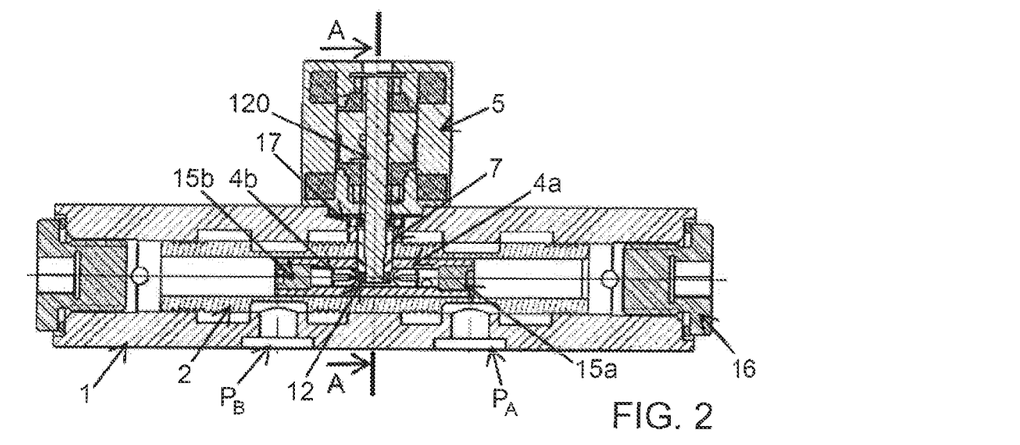
FIG. 2 is a schematic view of a servo valve according to the present disclosure.
Figure 3:
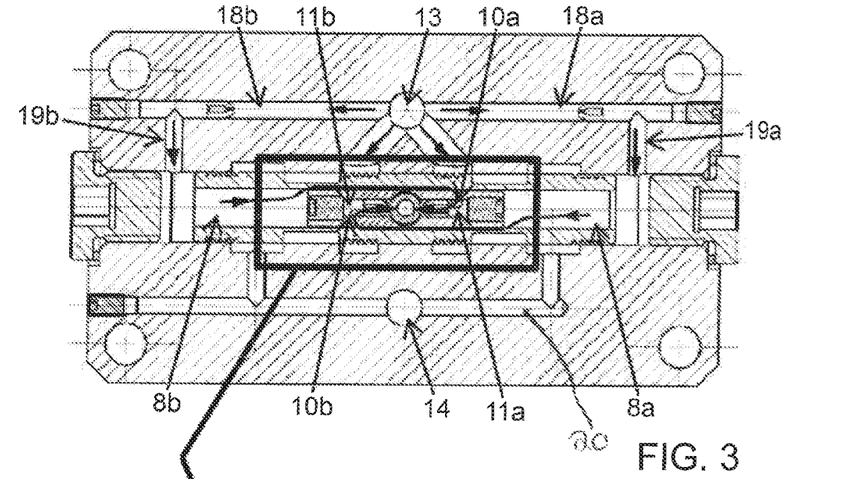
FIG. 3 shows a planar top view of the servo valve assembly of FIG. 2.
Figure 4:
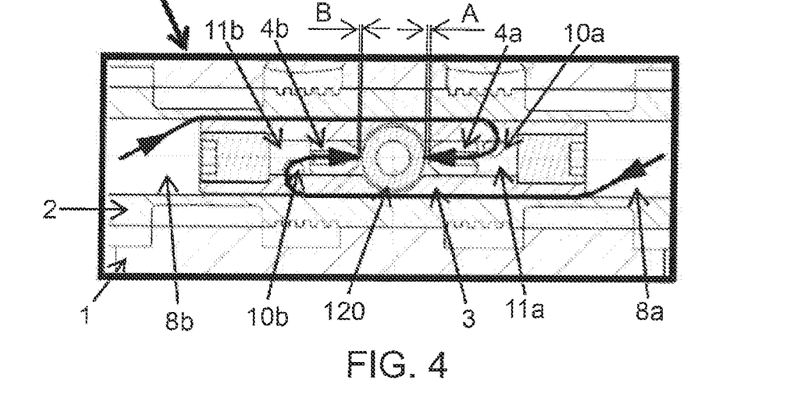
FIG. 4 shows a more detailed view of a spool part of the servo valve of FIG. 3.
Figure 5:
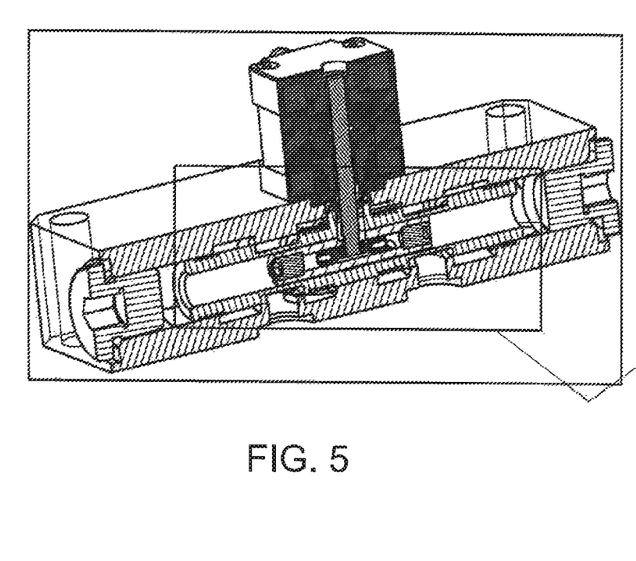
FIG. 5 is a perspective view of a servo valve according to the present disclosure.
Figure 6:
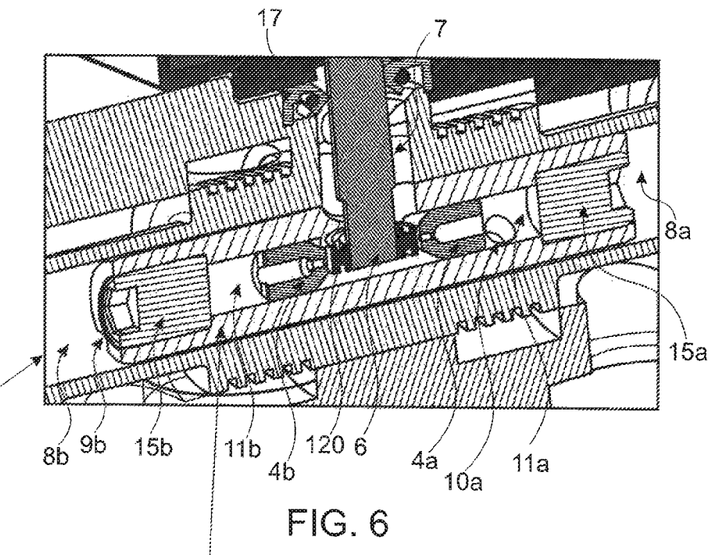
FIG. 6 is a close-up view of the spool of FIG. 5.
Figure 7:
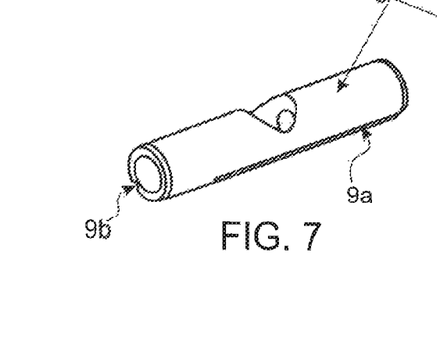
FIGS. 7 and 8 show a spool distribution sleeve from different perspectives.
Figure 8:
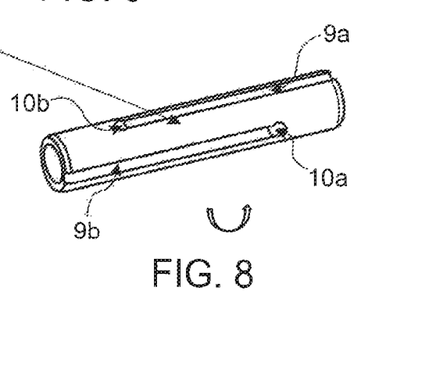
Figure 9:
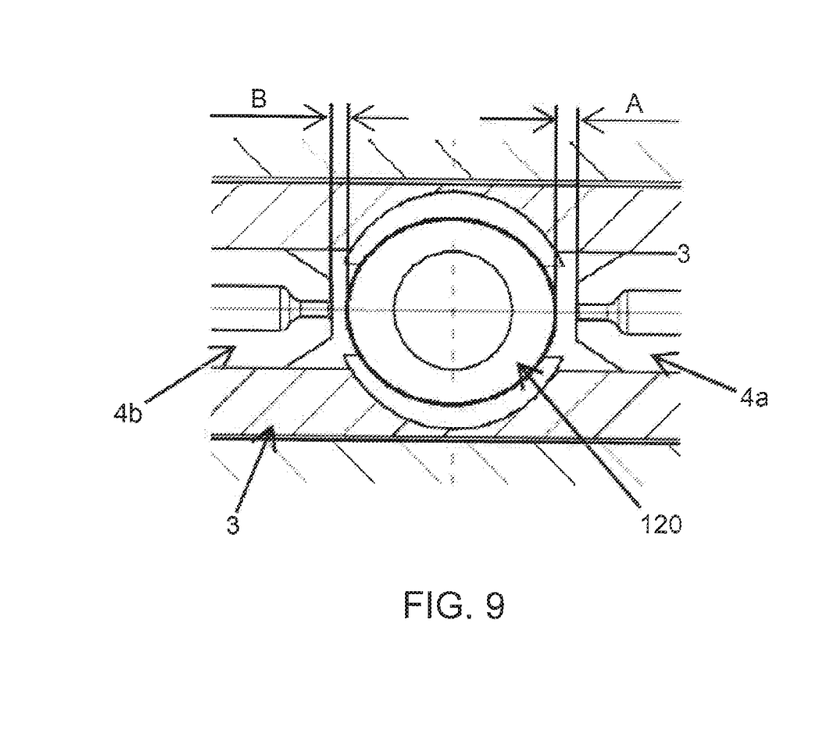
FIG. 9 is a partial plan view of the assembly of the disclosure.
Figure 10:
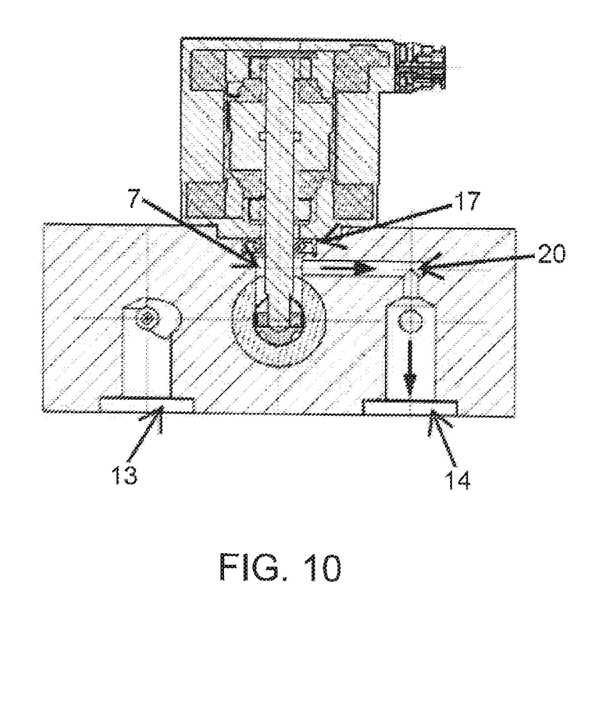
FIG. 10 is a sectional view of the assembly of the disclosure.
Figure 11:
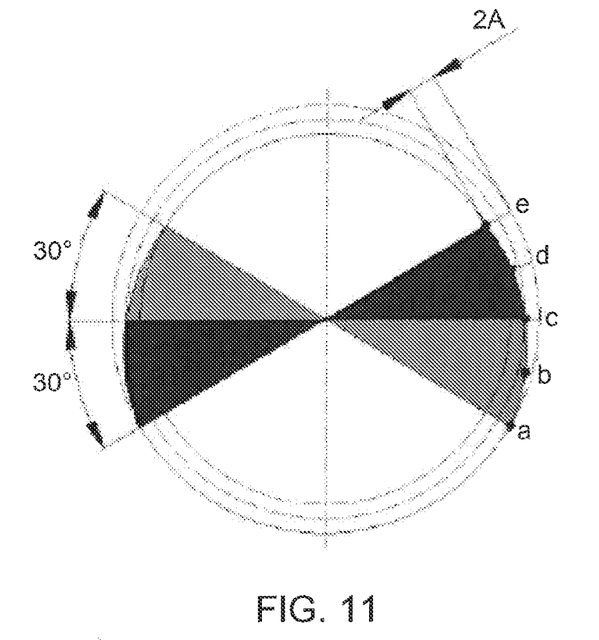
FIGS. 11 and 12 are used to explain the cam profile.

A typical flapper servo valve is shown in FIG. 1b. The assembly comprises a first stage 300 comprising the drive assembly, and a second stage 400 comprising a spool assembly. Operation of the valve comprises causing the spool 2 to move to the left and/or right so as to align ports in the spool 2 with fluid channels 500 to control the flow of fluid through the valve and out of a control port to control the actuator or other moveable part. The spool is part of a spool assembly having: supply ports, control ports, and a return port 4. Flow is possible between the ports PA, PB via a passage through the spool. The movement of the spool 2 is caused by the pressure of the hydraulic fluid (here oil supplied to the assembly from an oil reservoir or supply (not shown) via orifices but it can be any hydraulic fluid) acting on one or other of the ends of the spool 2 via channels 11,12. As shown by the arrows, fluid flow is from supply channel 3 into the body of the spool 2. Fluid is also diverted from the supply channel 3 into the channels 11 and 12, and further to the orifices 9,10 to create a pressure imbalance to control movement of the spool 2. In a balanced state, the fluid pressure in channels 11 and 12 is essentially equal. Some fluid (the same at each end) acts on the ends of the spool and the rest of the fluid in channels 11 and 12 exits via the orifices 9 and 10 where it is returned to the supply. The pressure at the respective ends is varied in accordance with a control signal applied to the drive assembly selected according to the desired output from the valve. The hydraulic fluid is returned to the supply via a channel 13.

Therefore, when the control signal is such as to cause the drive assembly to apply greater fluid pressure to one end of the spool, by diverting more fluid to that end via channel 12, as compared to channel 11, the spool 2 will move to the right. If greater fluid pressure is applied via channel 11, the spool 2 will move to the left. In the flapper arrangement, shown, the control signal is applied to a torque motor 16 and armature 5 which causes a flapper-type drive member 6 to deflect left or right, varying distances A and B. The flapper 6 is positioned between orifices 9, 10 at the ends of channels 11,12 respectively. If the control signal, via armature 5, causes the flapper 6 to move to the right thus reducing distance A/closing off orifice 10 of channel 12, then essentially all of the hydraulic fluid in channel 12, will be directed to the end of the spool as it can no longer exit orifice 10, thus increasing the pressure at the right end of the spool 2 and causing the spool to move to the left. If the control signal is such as to cause the flapper 6 to move to the left, closing orifice 9 of channel 11, then more pressure is provided to the other end of the spool 2 via channel 11, causing the spool 2 to move to the right.

A positioning mechanism may be provided at the ends of the valve spool, e.g. a torsion spring 14,15 at each of the respective ends of the valve spool or some other mechanical or electrical position feedback arrangement.

In an example, the assembly is arranged to control an actuator based on the fluid flow from the control port e.g. via a butterfly valve. The servo valve controls an actuator which, in turn, controls an air valve such as a butterfly valve.

Supply pressure is provided to the servo valve housing via the supply port and to the spool via spool supply ports. The pressure at the return port is a return pressure which will vary depending e.g. on the altitude of the aircraft in flight.

Control ports provide a controlled pressure, dependant on the nozzle/flapper position and resulting spool position, to be provided to an actuator.

The spool is in the form of a tubular member arranged in a valve block (not shown) to be moved axially by the hydraulic fluid.

In more detail, both in the conventional flapper or jet-pipe type assemblies, to open the servo valve, control current is provided to coils of the motor (e.g. a torque motor) creating electromagnetic torque opposing the sum of mechanical and magnetic torque already 'present' in the torque motor. The bigger the electromagnetic force from the coils, the more the jet pipe nozzle turns or the flapper pivots. The more it turns/pivots, the greater the linear or axial movement of the spool. A torque motor usually consists of coil windings, a ferromagnetic armature, permanent magnets and a mechanical spring (e.g. two torsional bridge shafts). This arrangement provides movement of the nozzle/flapper proportional to the input control current.

Jet-pipe arrangements can operate at high frequency but only for average pressure levels. In contrast, the flapper arrangements can operate at higher pressures but at lower frequency.

The apparatus of the present disclosure operates in a manner similar to the known flapper assembly, but using a simpler, more compact construction. This will be described with reference to FIGS. 2 to 14.

Instead of the drive element being a flapper element configured and operating as described above with reference to FIGS. 1a, 1b and 1c, that moves to the left and right to vary distances A and B, the arrangement of the present disclosure uses a modified drive element in the form of a flapper element having a cam profile at its end remote from the motor that drives the flapper element and the flapper element being rotated by the motor to vary the pressure acting on the ends of the spool due to the cam profile varying the fluid flow path as the flapper element rotates. The flapper element is preferably a flattened cylinder.

In a preferred embodiment, the flapper element extends from the armature into the spool housing and through an opening in the spool into the spool interior. The flapper element, or at least the end extending inside the spool interior preferably has a flattened outer surface to define the cam profile, best seen in FIGS. 11 and 12.

Figure 12:
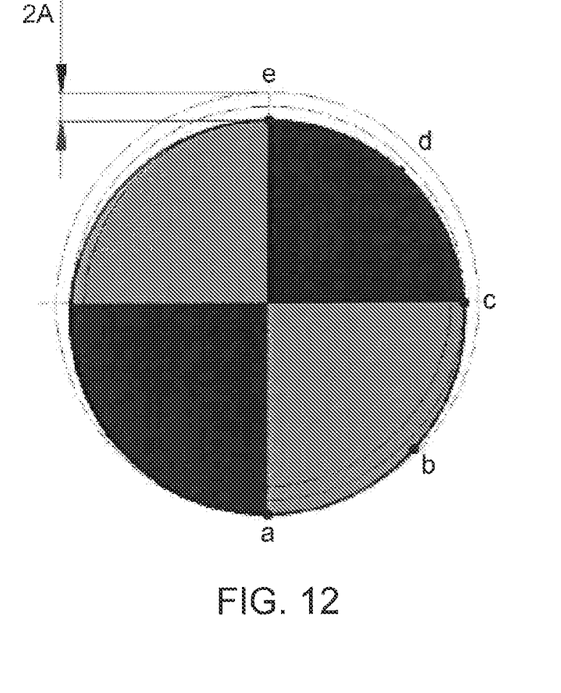
Figure 13:
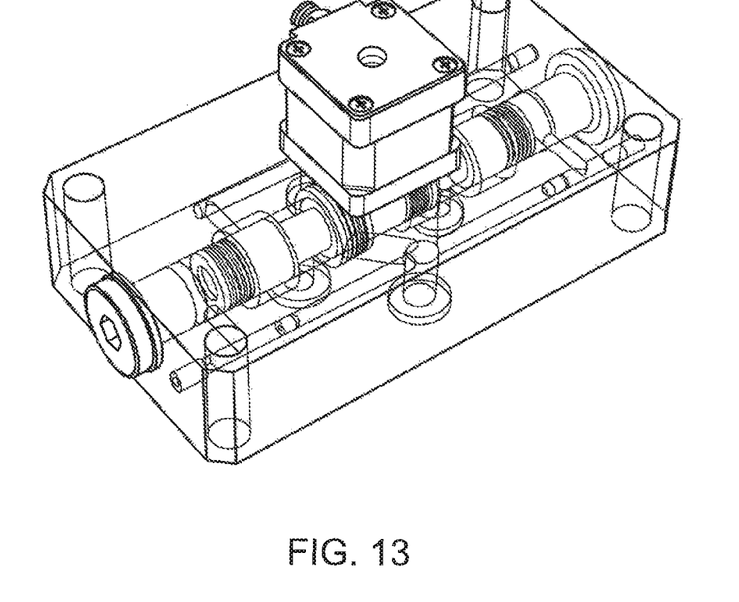
FIG. 13 is a perspective view of an assembly according to the disclosure.
Figure 14:
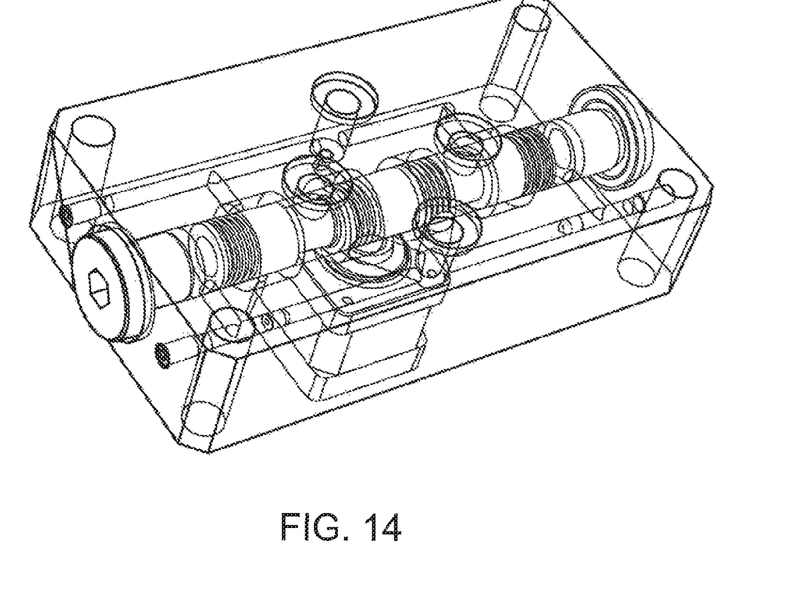
FIG. 14 is a perspective view of an embodiment.

The cam profile can be formed to best suit the desired application. In the example shown in FIG. 11, the cam has an angle of +/−30 deg. In the example of FIG. 12, the maximum angle of +/−90 deg. is shown. Other variations are possible.

In the embodiment where the flapper extends into the spool interior, a distribution sleeve 3 is preferably provided to properly guide the fluid flowing from the chambers 8a, 8b to nozzles 4b, 4a. This is shown most clearly in FIGS. 7 and 8.

As described above, in conventional designs, the movement of the spool is controlled by fluid pressure in fluid paths defined by channels 11,12 and chambers at the spool ends thus controlling movement of the spool according to fluid pressure acting on the outer ends of the spool. In the arrangement of this disclosure, channels 11,12 may no longer be required and the fluid flow is dynamically improved and more compact.

The operation of the assembly will now be described in more detail.

In the neutral position of the spool 2, fluid from the supply port 13 flows, on one side, through channel 18a, 19a into chamber 8a from where it flows into channel 9a, then through opening 10b into chamber 11b, then through nozzle 4b. The fluid then squeezes through gap B defined between nozzle 4b and the flapper element 120 (which has a cam profile) into channel 20 and to return port 14. At the same time, fluid from the supply port 13 flows in an analogous manner on the other side, through channel 18b, 19b into chamber 8b, into channel 9b, through openings 10 to chamber 11a, through nozzle 4a, through gap A into channel 20 from which it exits via return port 14. The pressure on the spool is thus balanced because gaps A and B are equal, and the spool therefore remains in its neutral position whereby there is no change in fluid flow at the control port.

If it is desired to move the spool 2 to align the control flow paths so that there is a change in fluid pressure at the control port, to drive an actuator, a command is received by the motor 5 to rotate the flapper element 120 by an amount and/or in a direction according to the desired movement of the spool 2.

In an example where the spool is to be moved to the right, the gap A is to be reduced (and, consequently gap B will be increased), a corresponding command is sent to the motor 5 which causes the flapper element 120 to rotate by a desired amount such that its cam profile causes gap A to be reduced. This has a throttle effect on the fluid flowing from nozzle 4a. Tracing the fluid flow path back from nozzle 4a, it can be seen that reducing flow from nozzle 4a will increase the pressure further back in that flow path causing the pressure in chambers 11a and 8b to increase. At the same time, because gap B is larger, fluid flows more freely from nozzle 4b and, in turn, the pressure in chambers 11b and 8a is less. This pressure imbalance acting on the ends of the spool 2 causes it to move to the right until the gaps A and B are equal, thus equalising the pressure in chambers 8a and 8b, when the spool 2 will stop moving.

The principle for moving the spool to the left is the same but here the flapper element will rotate so that, due to its cam profile, gap B is decreased and A is increased.

The principles of operation of the assembly due to the movement of the spool is as known in the art and will not be described here in detail.

The assembly of this disclosure will be more simple and compact than the known assemblies and exhibits improved fluid dynamics.

Because of the direction of fluid flow in embodiments in which the flapper extends into the spool interior, it is possible to do without springs at the ends of the spool 2 to centre the spool, and to do without feedback or position sensors. The system is thus much simple, lighter and more responsive. Also, because the cam profile of the flapper element is in a low pressure region of the assembly, it can have a simpler, lighter design without additional seals etc. Inserting the cylindrical flapper into a low pressure zone also provides the possibility of working the servo valve at high pressure.

The use of the cam profile means that the assembly can be easily formed to meet individual requirements and that characteristics can be easily adjusted and corrected.

Thus, a servo valve assembly according to this disclosure is much smaller, lighter and simpler and more responsive than existing designs.

Although this disclosure has been described in terms of preferred examples, it should be understood that these examples are illustrative only and modifications and alterations are possible within the scope of the claims.

The invention claimed is:

1. A servo valve comprising:
a fluid transfer valve assembly comprising a supply port and a control port (PA, PB);
a moveable valve spool arranged to regulate flow of fluid from the supply port to the control port in response to a control signal; and
a drive means configured to axially move the valve spool relative to the fluid transfer assembly in response to the control signal to regulate the fluid flow;
wherein the drive means comprises an elongate member arranged to rotate in response to the control signal, the elongate member having a cam profile in the fluid flow path such as to vary the pressure acting on the ends of the spool as the cam profile rotates;
wherein the valve spool comprises:
first and second chambers, each chamber provided with a nozzle through which fluid from the supply port flows, wherein the drive member is positioned between the nozzle of the first chamber and the nozzle of the second chamber such that rotation of the cam profile varies the flow of fluid through the nozzles;
wherein the valve further includes a distribution sleeve arranged within the spool and into which the elongate member extends.

2. The servo valve of claim 1, wherein the elongate member extends into the valve spool, and a part of the elongate member extending within the valve spool defines the cam profile.

3. The servo valve of claim 1, wherein the elongate member is a cylindrical element having a flattened portion defining the cam profile.

4. The servo valve of claim 1, wherein the cam profile defines an angle of +/−30 degrees.

5. The servo valve of claim 1, wherein the cam profile defines an angle of +/−90 degrees.

6. The servo valve of claim 1, further comprising a torque motor to cause the elongate member to rotate in response to the control signal.

7. A method of driving a moveable valve spool of a servo valve as recited in claim 1 comprising:
causing rotation of the cam profile of the elongate drive element to rotate in response to the control signal.

8. The method of claim 7, further comprising:
providing the control signal to a motor, the motor causing rotation of the drive element.

* * * * *